United States Patent
Murai et al.

(10) Patent No.: US 12,272,191 B2
(45) Date of Patent: Apr. 8, 2025

(54) DISPLAY CONTROL DEVICE, DISPLAY CONTROL METHOD, AND DISPLAY CONTROL PROGRAM

(71) Applicant: TOYOTA JIDOSHA KABUSHIKI KAISHA, Aichi-ken (JP)

(72) Inventors: Tatsunobu Murai, Okazaki (JP); Hirotaka Murakami, Nagoya (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 148 days.

(21) Appl. No.: 17/685,392

(22) Filed: Mar. 3, 2022

(65) Prior Publication Data

US 2022/0375282 A1 Nov. 24, 2022

(30) Foreign Application Priority Data

May 19, 2021 (JP) ................. 2021-084597

(51) Int. Cl.
 *G07C 5/08* (2006.01)
 *G07C 5/04* (2006.01)
(52) U.S. Cl.
 CPC ............. *G07C 5/0825* (2013.01); *G07C 5/04* (2013.01)
(58) Field of Classification Search
 CPC ...... G07C 5/0825; G07C 5/04; G07C 5/0841; B60K 2360/174; B60K 35/00; B60L 2250/16; Y02T 10/84
 See application file for complete search history.

(56) References Cited

U.S. PATENT DOCUMENTS

| 2011/0125357 | A1 | 5/2011 | Harumoto et al. |
| 2011/0205044 | A1* | 8/2011 | Enomoto ............. G07C 5/0841 340/439 |
| 2022/0358769 | A1* | 11/2022 | Wang .................. G06V 20/597 |

FOREIGN PATENT DOCUMENTS

| CN | 110770084 A | 2/2020 |
| JP | 2003-106207 A | 4/2003 |
| JP | 2003-115065 A | 4/2003 |
| JP | 201041750 A | 2/2010 |

* cited by examiner

*Primary Examiner* — Yufeng Zhang
(74) *Attorney, Agent, or Firm* — HAUPTMAN HAM, LLP

(57) ABSTRACT

An acquisition unit that acquires vehicle information related to a vehicle state of a vehicle; a determination unit that determines whether the vehicle has traveled in a state in which energy consumption efficiency of the vehicle is poor within a predetermined time from a predetermined driving operation of the vehicle based on the vehicle information acquired by the acquisition unit; and a display control unit that causes a display unit to display the number of times of traveling in the state per unit time within the predetermined time from the predetermined driving operation, the traveling being determined by the determination unit, are included.

14 Claims, 10 Drawing Sheets

<TOTAL>

DRIVER A: 200 TIMES ON APRIL 30, 2021

DRIVER B: 150 TIMES ON APRIL 30, 2021

DRIVER C: 100 TIMES ON APRIL 30, 2021

· · ·

86 AFTER STARTING OPERATION

87 AFTER ACCELERATION OPERATION

88 AFTER TURN SIGNAL OPERATION

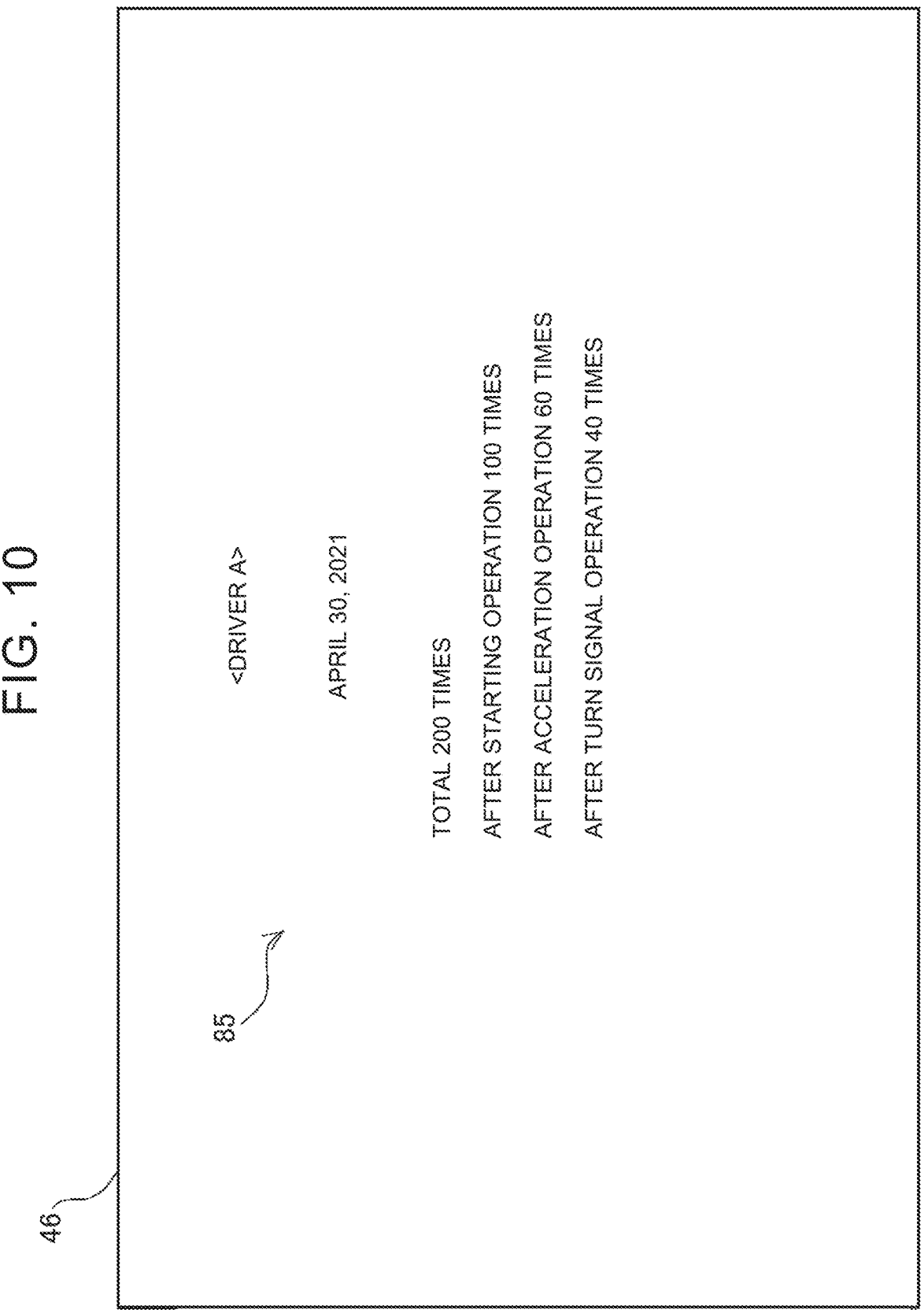

DISPLAY CONTROL DEVICE, DISPLAY CONTROL METHOD, AND DISPLAY CONTROL PROGRAM

CROSS-REFERENCE TO RELATED APPLICATION

This application claims priority to Japanese Patent Application No. 2021-084597 filed on May 19, 2021, incorporated herein by reference in its entirety.

BACKGROUND

1. Technical Field

The present disclosure relates to a display control device, a display control method, and a display control program.

2. Description of Related Art

Japanese Unexamined Patent Application Publication No. 2010-41750 (JP 2010-41750 A) discloses a technique for improving willingness of a driver to improve driving operation and awareness of fuel-efficient driving.

SUMMARY

However, since the technology disclosed in JP 2010-41750 A has a configuration in which a degree of fuel-saving driving of the driver is displayed on a display unit of a vehicle, a manager who manages the driver cannot keep track of a frequency of driving with poor energy consumption efficiency performed by the driver, and thus it is difficult to instruct the driver to improve the driving operation later on.

Therefore, it is an object of the present disclosure to provide a display control device, a display control method, and a display control program that can cause a driver to understand driving with poor energy consumption efficiency when a driving guidance is provided.

A display control device according to a first aspect of the present disclosure includes: an acquisition unit that acquires vehicle information related to a vehicle state of a vehicle; a determination unit that determines whether the vehicle has traveled in a state in which energy consumption efficiency of the vehicle is poor within a predetermined time from a predetermined driving operation of the vehicle based on the vehicle information acquired by the acquisition unit; and a display control unit that causes a display unit to display the number of times of traveling in the state determined by the determination unit per unit time within the predetermined time from the predetermined driving operation.

In the display control device according to the first aspect, the acquisition unit acquires vehicle information related to the vehicle state of the vehicle. Further, the determination unit determines whether the vehicle has traveled in the state in which the energy consumption efficiency of the vehicle is poor within the predetermined time from the predetermined driving operation of the vehicle based on the vehicle information acquired by the acquisition unit. Then, the display control unit that causes the display unit to display the number of times of traveling in the state per unit time determined by the determination unit within the predetermined time from the predetermined driving operation. With this process, in the display control device, the number of times of traveling in the state in which the energy consumption efficiency of the vehicle is poor per day is displayed on the display unit, whereby the driver can be caused to understand driving with poor energy consumption efficiency based on the number of times of traveling when the driving guidance is provided.

In the display control device according to the first aspect, the vehicle is a hybrid electric vehicle equipped with a plurality of power sources of an engine and a motor; and the determination unit determines whether the vehicle has traveled with poor fuel consumption efficiency of the engine as the state within the predetermined time from the predetermined driving operation of the vehicle based on the vehicle information acquired by the acquisition unit.

In the display control device according to the above aspect, the vehicle is a hybrid electric vehicle equipped with the power sources of the engine and the motor. Then, the determination unit determines whether the vehicle has traveled with poor fuel consumption efficiency of the engine as the state within the predetermined time from the predetermined driving operation of the vehicle based on the vehicle information acquired by the acquisition unit. With this process, in the display control device, the number of times of traveling in the state in which the fuel consumption efficiency of the engine is poor per unit time is displayed on the display unit in the hybrid electric vehicle, whereby the driver can be caused to understand driving with poor fuel consumption efficiency of the engine based on the number of times of traveling in the state when the driving guidance is provided.

In the display control device according to the above aspect, the predetermined driving operation is at least one of an accelerator operation at a time of starting, an accelerator operation during traveling, and a turn signal operation.

In the display control device according to the above aspect, the predetermined driving operation is at least one of the accelerator operation at the time of starting, the accelerator operation during traveling, and the turn signal operation. With this configuration, in the display control device, the driver can be caused to understand the number of times of traveling by the driver with poor energy consumption efficiency within the predetermined time from at least one of the accelerator operation at the time of starting the vehicle, the accelerator operation during traveling, and the turn signal operation.

A display control method according to a second aspect of the present disclosure includes: acquiring vehicle information related to a vehicle state of a vehicle; determining whether the vehicle has traveled in a state in which energy consumption efficiency of the vehicle is poor within a predetermined time from a predetermined driving operation of the vehicle based on the acquired vehicle information; and causing a display unit to display the number of times of determined traveling in the state per unit time within the predetermined time from the predetermined driving operation.

A display control program according to a third aspect of the present disclosure causes a computer to: acquire vehicle information related to a vehicle state of a vehicle; determine whether the vehicle has traveled in a state in which energy consumption efficiency of the vehicle is poor within a predetermined time from a predetermined driving operation of the vehicle based on the acquired vehicle information; and cause a display unit to display the number of times of determined traveling in the state per unit time within the predetermined time from the predetermined driving operation.

As described above, a display control device, a display control method, and a display control program according to the present disclosure can cause the driver to understand driving with poor energy consumption efficiency when driving guidance is provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 6 is a first display example of a Web application displayed on the display control device according to the present embodiment;

FIG. 10 is a display example of the Web application displayed on the driver terminal according to the present embodiment.

DETAILED DESCRIPTION OF EMBODIMENTS

Hereinafter, a display control system 10 according to the present embodiment will be described.
The display control system 10 according to the present embodiment is a system that executes display control of a Web application that can be viewed by both a driver of a business operator that operates a vehicle, such as a taxi company and a transportation company, and a manager who manages the driver.

Figure 1:
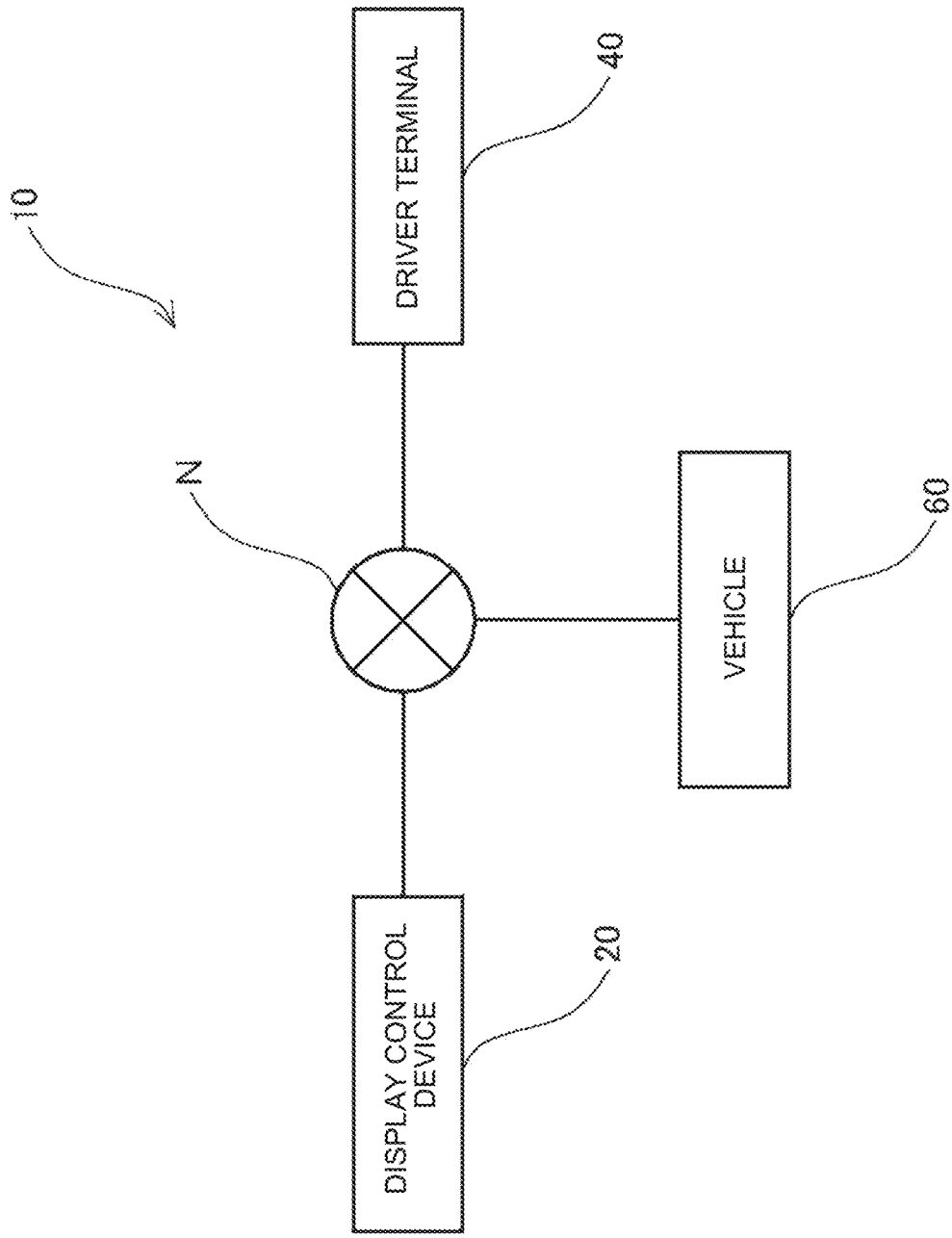
FIG. 1 is a diagram showing a schematic configuration of a display control system according to the present embodiment.

FIG. 1 is a diagram showing a schematic configuration of the display control system 10. As shown in FIG. 1, the display control system 10 includes a display control device 20, a driver terminal 40, and a vehicle 60. The display control device 20, the driver terminal 40, and the vehicle 60 are connected via the network N and are communicable with each other. The vehicle 60 connected to the network N is, for example, an automobile that travels while carrying a user.

The display control device 20 is a server computer owned by a business operator that manages the vehicle 60. The driver terminal 40 is a mobile terminal owned by the driver of the vehicle 60. As an example, a portable personal computer (notebook PC), a smartphone, a tablet terminal, or the like is applied to the driver terminal 40. In the present embodiment, as an example, the driver terminal 40 is a smartphone.

The vehicle 60 is a split-type hybrid electric vehicle equipped with a plurality of power sources of an engine and a motor.

Figure 2:
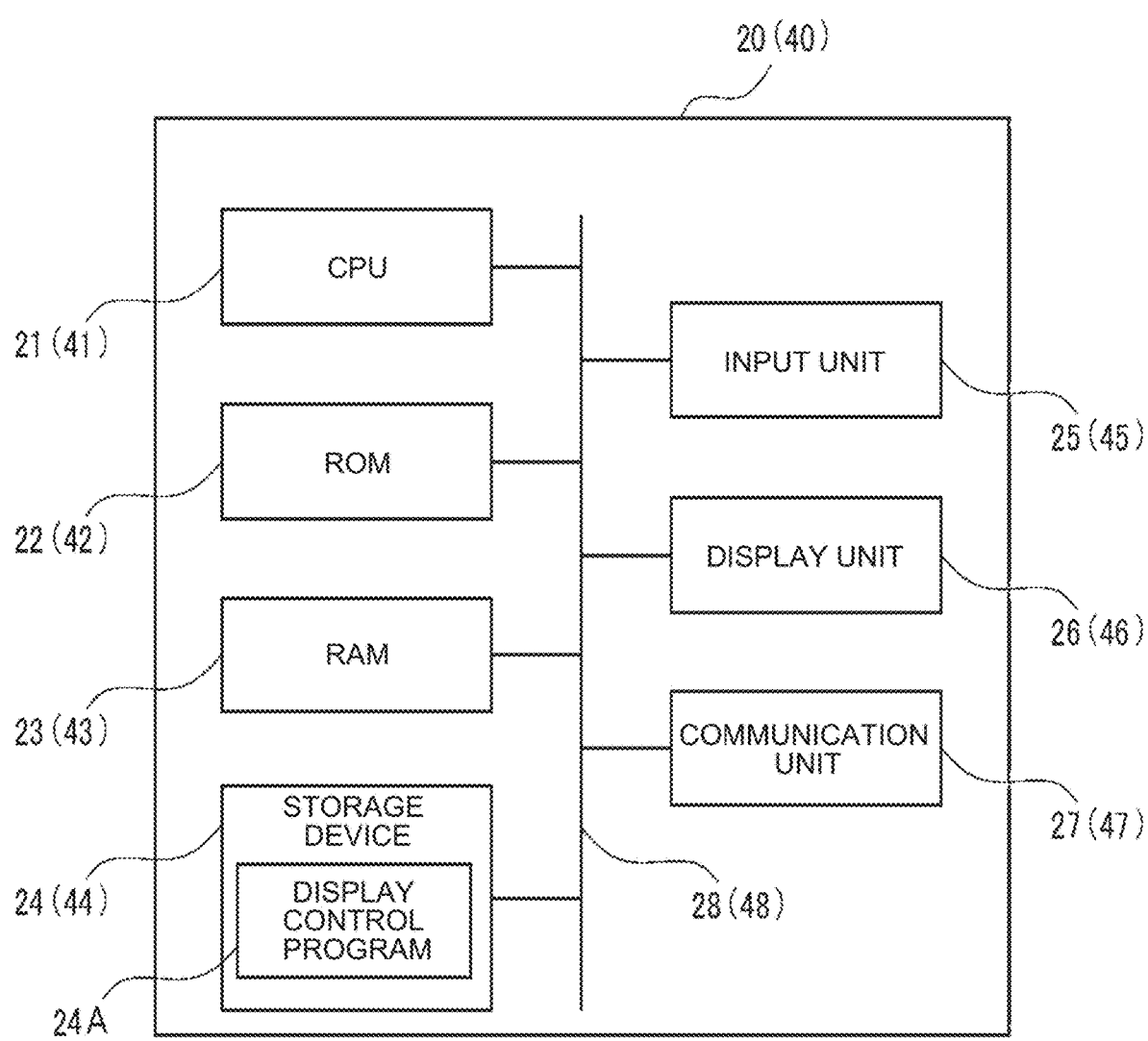
FIG. 2 is a block diagram showing a hardware configuration of a display control device and a driver terminal according to the present embodiment.

Next, the hardware configuration of the display control device 20 and the driver terminal 40 will be described. FIG. 2 is a block diagram showing a hardware configuration of the display control device 20 and the driver terminal 40. Since the display control device 20 and the driver terminal 40 basically have a general computer configuration, the display control device 20 will be described as a representative.

As shown in FIG. 2, the display control device 20 includes a central processing unit (CPU) 21, a read only memory (ROM) 22, a random access memory (RAM) 23, a storage unit 24, an input unit 25, a display unit 26, and a communication unit 27. Each configuration is communicably connected to each other via a bus 28.

The CPU 21 is a central processing unit that executes various programs and that controls various units. That is, the CPU 21 reads the program from the ROM 22 or the storage unit 24 and executes the program using the RAM 23 as a work area. The CPU 21 controls each of the above configurations and performs various arithmetic processes in accordance with the program recorded in the ROM 22 or the storage unit 24.

The ROM 22 stores various programs and various data. The RAM 23 temporarily stores a program or data as a work area.

The storage unit 24 is composed of a storage device such as a hard disk drive (HDD), a solid state drive (SSD), or a flash memory, and stores various programs and various data. In the present embodiment, the storage unit 24 stores at least a display control program 24A for executing a display process described later. Further, the storage unit 24 stores the number of times of traveling of the vehicle 60 in a specific state per day for each driver.

The input unit 25 includes a pointing device such as a mouse, a keyboard, a microphone, a camera, and the like, and is used for performing various inputs.

The display unit 26 is, for example, a liquid crystal display and displays various types of information. A touch panel may be adopted as the display unit 26 and may function as the input unit 25.

The communication unit 27 is an interface for communicating with other devices. For the communication, for example, a wired communication standard such as Ethernet (registered trademark) or fiber-distributed data interface (FDDI), or a wireless communication standard such as fourth generation (4G), fifth generation (5G), or Wi-Fi (registered trademark) is used.

When executing the above-mentioned display control program 24A, the display control device 20 executes the processes based on the above-mentioned display control program 24A using the above-mentioned hardware resources.

Figure 3:
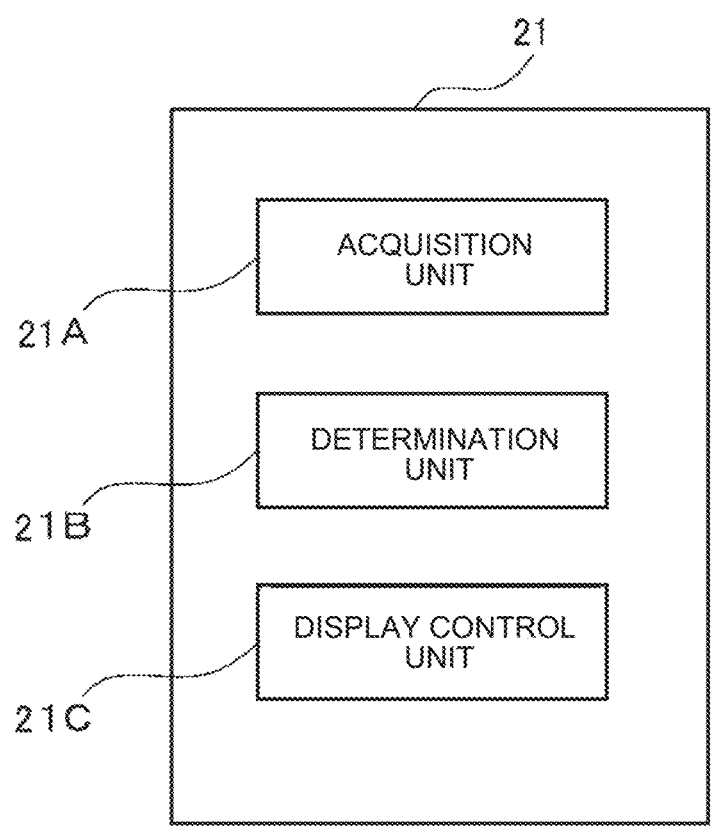
FIG. 3 is a block diagram showing an example of a functional configuration of the display control device according to the present embodiment.

Next, the functional configuration of the display control device 20 will be described. FIG. 3 is a block diagram showing an example of a functional configuration of the display control device 20 according to the present embodiment.

As shown in FIG. 3, the CPU 21 of the display control device 20 includes an acquisition unit 21A, a determination unit 21B, and a display control unit 21C as functional configurations. Each functional configuration is realized when the CPU 21 reads and executes the display control program 24A stored in the storage unit 24.

The acquisition unit 21A acquires vehicle information related to a vehicle state of the vehicle 60. Specifically, the acquisition unit 21A acquires, as the vehicle information, a steering angle, an acceleration, a vehicle speed, and a turn signal operation of the vehicle 60 respectively detected by a steering angle sensor 71, an acceleration sensor 72, a vehicle speed sensor 73, and a turn signal switch 74 (to be described later) that are included in the vehicle 60. Further, the acquisition unit 21A acquires, as the vehicle information, the engine speed, engine torque, fuel consumption, and accelerator operation of the vehicle 60 detected by an electronic control unit (ECU) 70C (to be described later) included in the vehicle 60.

The determination unit 21B determines, based on the vehicle information acquired by the acquisition unit 21A, whether the vehicle 60 has traveled in a specific state in which the energy consumption efficiency of the vehicle 60 is poor within a predetermined time from the predetermined driving operation of the vehicle 60. The specific state is an example of a "state". In the present embodiment, as an example, the above-mentioned predetermined time is set to "one second". The energy consumption efficiency is the energy consumption efficiency required for traveling of the vehicle, and includes, for example, fuel consumption efficiency and electricity cost efficiency. In the present embodiment, the determination unit 21B determines whether the vehicle 60 has traveled with poor fuel consumption efficiency of the engine as the specific state within the predetermined time from a predetermined driving operation of the vehicle 60 that is a hybrid electric vehicle based on the vehicle information.

Here, in the present embodiment, the above-mentioned predetermined driving operation includes an accelerator operation at the time of starting (hereinafter referred to as "starting operation"), an accelerator operation during traveling (hereinafter referred to as "acceleration operation"), and a turn signal operation.

As an example, when the accelerator operation is detected by the ECU 70C while the vehicle 60 is stopped, the determination unit 21B determines that the starting operation has been performed. Further, the determination unit 21B determines that the acceleration operation has been performed when the acceleration sensor 72 detects a predetermined acceleration after the accelerator operation is detected by the ECU 70C while the vehicle 60 is traveling. Further, when the operation of the turn signal switch 74 is detected by an ECU 70D, the determination unit 21B determines that the turn signal operation has been performed.

Then, as an example, the determination unit 21B determines that the vehicle 60 has traveled in the specific state when the relationship between the engine speed and the engine torque of the vehicle 60 detected by the ECU 70C within the predetermined time from any of the above predetermined driving operations corresponds to a certain relationship defined for each vehicle.

The display control unit 21C causes the display unit 26 to display the number of times of traveling in the specific state determined by the determination unit 21B per day as a unit time within the predetermined time from the predetermined driving operation. A specific example of the number of times of traveling in the specific state displayed on the display unit 26 will be described later.

Figure 4:
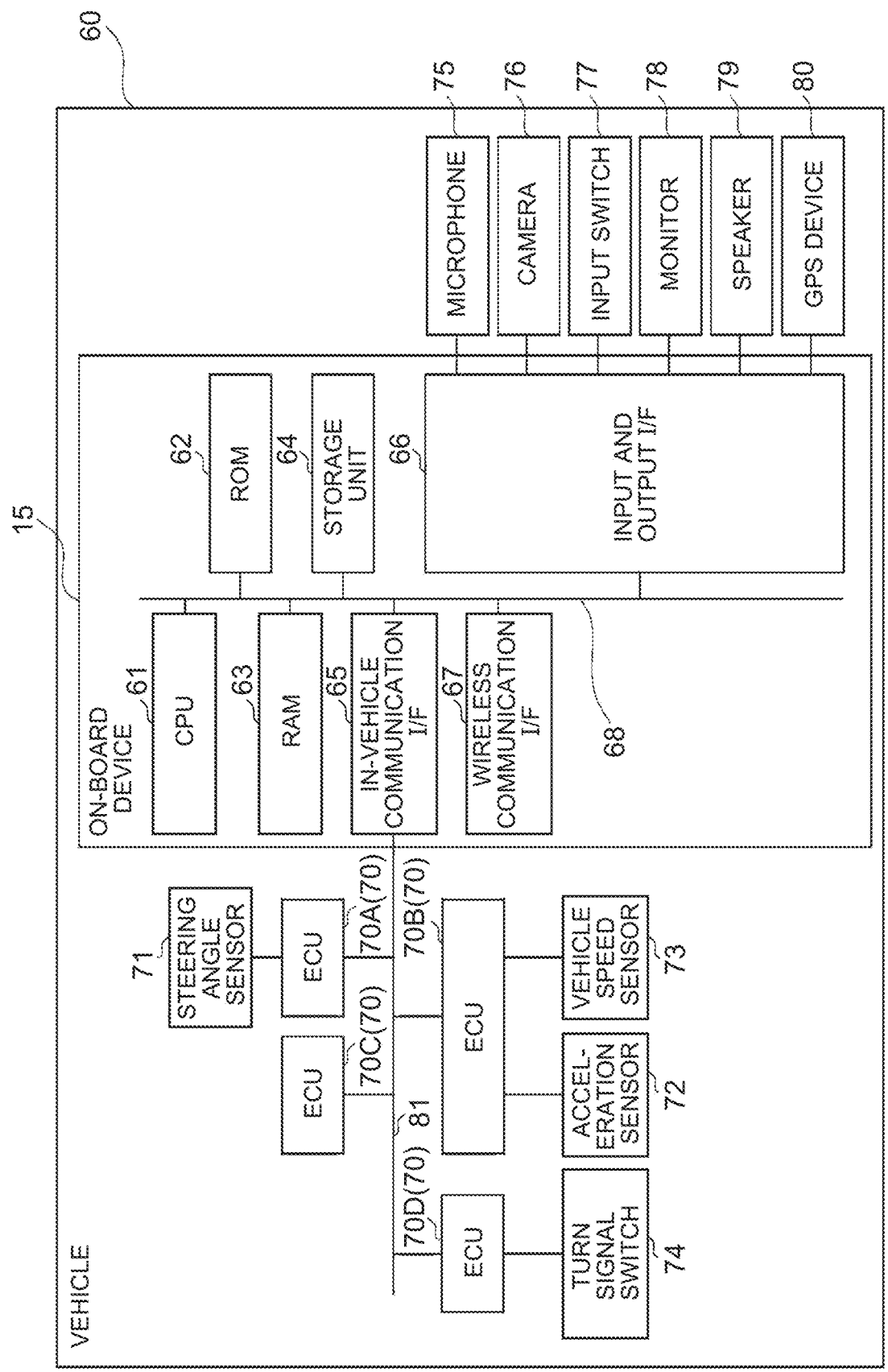
FIG. 4 is a block diagram showing a hardware configuration of a vehicle according to the present embodiment.

Next, the hardware configuration of the vehicle 60 will be described. FIG. 4 is a block diagram showing a hardware configuration of the vehicle 60.

As shown in FIG. 4, the vehicle 60 is configured to include an on-board device 15, a plurality of ECUs 70, the steering angle sensor 71, the acceleration sensor 72, the vehicle speed sensor 73, the turn signal switch 74, a microphone 75, a camera 76, an input switch 77, a monitor 78, a speaker 79, and a global positioning system (GPS) device 80.

The on-board device 15 is configured to include a CPU 61, a ROM 62, a RAM 63, a storage unit 64, an in-vehicle communication interface (I/F) 65, an input and output I/F 66, and a wireless communication I/F 67. The CPU 61, the ROM 62, the RAM 63, the storage unit 64, the in-vehicle communication I/F 65, the input and output I/F 66, and the wireless communication I/F 67 are connected to each other so as to be communicable with each other via an internal bus 68.

The CPU 61 is a central processing unit that executes various programs and that controls various units. That is, the CPU 61 reads the program from the ROM 62 or the storage unit 64 and executes the program using the RAM 63 as a work area. The CPU 61 controls each of the above configurations and performs various arithmetic processes in accordance with the program recorded in the ROM 62 or the storage unit 64.

The ROM 62 stores various programs and various data. The RAM 63 temporarily stores a program or data as a work area.

The storage unit 64 is composed of a storage device such as an HDD, an SSD, or a flash memory, and stores various programs and various data.

The in-vehicle communication I/F 65 is an interface for connecting to the ECUs 70. For the interface, a communication standard based on a controller area network (CAN) protocol is used. The in-vehicle communication I/F 65 is connected to an external bus 81.

The ECUs 70 are provided for respective functions of the vehicle 60, and in the present embodiment, an ECU 70A, an ECU 70B, the ECU 70C, and the ECU 70D are provided. The ECU 70A is exemplified by an electric power steering ECU, and the steering angle sensor 71 is connected to the ECU 70A. Further, the ECU 70B is exemplified by a vehicle stability control (VSC) ECU, and the acceleration sensor 72 and the vehicle speed sensor 73 are connected to the ECU 70B. In addition to the acceleration sensor 72 and the vehicle speed sensor 73, a yaw rate sensor may be connected to the ECU 70B.

The ECU 70C is exemplified by an engine ECU, and detects the engine speed and engine torque of the vehicle 60 to control the engine. Further, the ECU 70C detects fuel consumption based on a fuel flow rate acquired from sensors (not shown). Further, the ECU 70C detects the accelerator operation of the vehicle 60. The engine rotation speed, engine torque, fuel consumption, and accelerator operation detected by the ECU 70C are stored in the storage unit 64 and transmitted to the display control device 20 as the vehicle information. Further, the ECU 70D is exemplified by a steering ECU, and the turn signal switch 74 is connected to the ECU 70D. The turn signal switch 74 is provided on the steering column for operating the turn signal. The ECU 70D detects the operation of the turn signal switch 74 by the driver as the turn signal operation. The turn signal operation detected by the ECU 70D is stored in the storage unit 64 and transmitted to the display control device 20 as the vehicle information.

The steering angle sensor 71 is a sensor for detecting the steering angle of the steering wheel. The steering angle detected by the steering angle sensor 71 is stored in the storage unit 64 and transmitted to the display control device 20 as the vehicle information.

The acceleration sensor 72 is a sensor for detecting the acceleration acting on the vehicle 60. The acceleration sensor 72 is, for example, a three-axis acceleration sensor that detects the acceleration applied in the vehicle front-rear direction as the X-axis direction, the vehicle width direction as the Y-axis direction, and the vehicle height direction as the Z-axis direction. The acceleration detected by the acceleration sensor 72 is stored in the storage unit 64 and transmitted to the display control device 20 as the vehicle information.

The vehicle speed sensor 73 is a sensor for detecting a vehicle speed of the vehicle 60. The vehicle speed sensor 73 is, for example, a sensor provided on a wheel. The vehicle speed detected by the vehicle speed sensor 73 is stored in the storage unit 64 and transmitted to the display control device 20 as the vehicle information.

The input and output I/F 66 is an interface for communicating with the microphone 75, the camera 76, the input switch 77, the monitor 78, the speaker 79, and the GPS device 80 mounted on the vehicle 60.

The microphone 75 is a device provided on the front pillar, a dashboard, or the like of the vehicle 60, and collects voices emitted by the driver of the vehicle 60. The microphone 75 may be provided in the camera 76 that will be described later.

The camera 76 is configured to include a charge coupled device (CCD) image sensor as an example. The camera 76 is provided, for example, at the front portion of the vehicle 60 and captures an image of the front of the vehicle 60. The image captured by the camera 76 is used, for example, for recognizing the inter-vehicle distance with the preceding vehicle traveling in front of the vehicle 60, the lanes, the traffic lights, and the like. The image captured by the camera 76 is stored in the storage unit 64 and transmitted to the display control device 20. Note that, the camera 76 may be configured as an imaging device for other purposes such as a driving recorder. Further, the camera 76 may be connected to the on-board device 15 via the ECU 70 (for example, a camera ECU).

The input switch 77 is provided on the instrument panel, the center console, the steering wheel, or the like, and is a switch for inputting an operation by fingers of the driver. As the input switch 77, for example, a push button type numeric keypad, a touch pad, or the like can be adopted.

The monitor 78 is a liquid crystal monitor provided on an instrument panel, a meter panel, or the like, for displaying an image of an operation proposal related to a function of the vehicle 60 and an explanation of the function. The monitor 78 may be provided as a touch panel that also serves as the input switch 77.

The speaker 79 is a device provided on an instrument panel, a center console, a front pillar, a dashboard, or the like, for outputting a voice for an operation proposal related to a function of the vehicle 60 and an explanation of the function. The speaker 79 may be provided on the monitor 78.

The GPS device 80 is a device that measures the current position of the vehicle 60. The GPS device 80 includes an antenna (not shown) that receives signals from GPS satellites. Note that, the GPS device 80 may be connected to the on-board device 15 via a car navigation system connected to the ECU 70 (for example, a multimedia ECU).

The wireless communication I/F 67 is a wireless communication module for communicating with the display control device 20. For the wireless communication module, for example, communication standards such as 5G, long term evolution (LTE), and Wi-Fi (registered trademark) are used. The wireless communication I/F 67 is connected to the network N.

Figure 5:
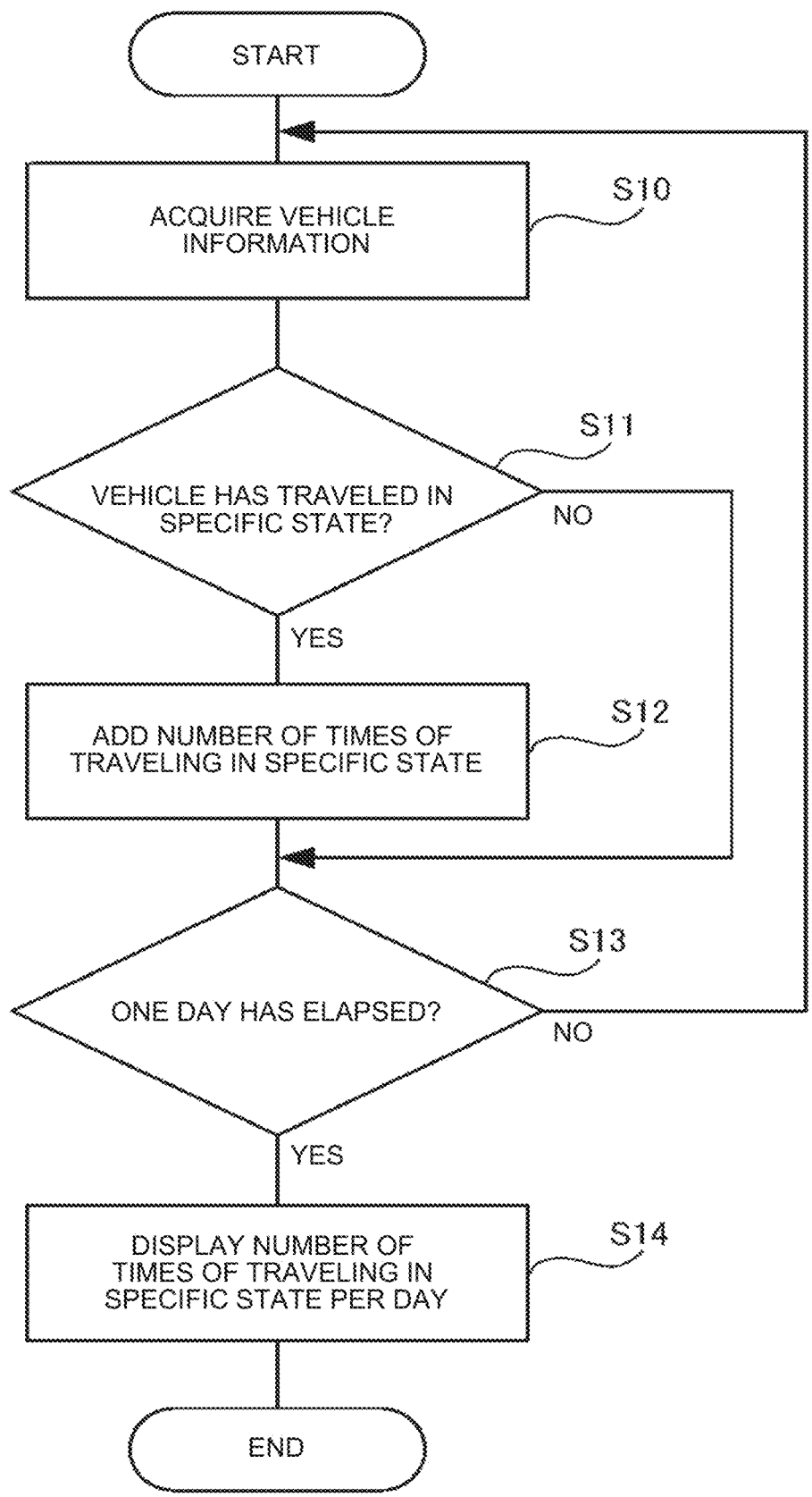
FIG. 5 is a flowchart showing a flow of a display process executed by the display control device according to the present embodiment.

FIG. 5 is a flowchart showing a flow of a display process executed by the display control device 20 to display the number of times of traveling in the specific state per day on the display unit 26. The display process is executed when the CPU 21 reads the display control program 24A from the storage unit 24, expands the display control program 24A into the RAM 23, and executes the program.

In step S10 shown in FIG. 5, the CPU 21 acquires the vehicle information from the vehicle 60. Then, the process proceeds to step S11. In the present embodiment, as an example, the vehicle information is transmitted from the vehicle 60 to the display control device 20 every hour.

In step S11, the CPU 21 determines whether the vehicle has traveled in the specific state based on the vehicle information acquired in step S10. When the CPU 21 determines that the vehicle has traveled in the specific state (step S11: YES), the process proceeds to step S12. On the other hand, when the CPU 21 determines that the vehicle does not travel in the specific state (step S11: NO), the process proceeds to step S13. As an example, the CPU 21 determines that the relationship between the engine speed and the engine torque of the vehicle 60 within the predetermined time from any predetermined driving operation of the starting operation, the acceleration operation, and the turn signal operation corresponds to a certain relationship defined for each vehicle. When the relationship corresponds to the certain relationship, the CPU 21 determines that the vehicle 60 "has traveled in the specific state".

In step S12, the CPU 21 adds the number of times of traveling in the specific state determined in step S11 to the number of times of traveling in the specific state per day corresponding to the driver of the vehicle 60 that is stored in the storage unit 24. Then, the process proceeds to step S13.

In step S13, the CPU 21 determines whether one day as unit time has elapsed since the start of the display process. When the CPU 21 determines that one day has elapsed (step S13: YES), the process proceeds to step S14. On the other hand, when the CPU 21 determines that one day has not elapsed (step S13: NO), the process returns to step S10.

In step S14, the CPU 21 causes the display unit 26 to display the number of times of traveling in the specific state per day corresponding to the driver of the vehicle 60. Then, the process ends.

Next, in step S14 shown in FIG. 5, a display example of the Web application displayed on the display unit 26 of the display control device 20 will be described.

FIG. 6 is a first display example of the Web application displayed on the display unit 26 of the display control device 20. The CPU 21 causes the display unit 26 to display the display example shown in FIG. 6 when the Web application is executed in the display control device 20 and a predetermined operation is performed on the Web application.

In the display example shown in FIG. 6, a result display unit 85, a screen switching button 86, a screen switching button 87, and a screen switching button 88 are displayed.

The result display unit 85 is a portion that displays the number of times of traveling in the specific state per day corresponding to the driver of the vehicle 60. The result display unit 85 shown in FIG. 6 displays the total number of times of traveling in the specific state per day corresponding to a plurality of drivers managed by the manager. Specifically, the result display unit 85 displays that the total number of traveling in the specific state on Apr. 30, 2021 is "200 times" for a driver A, "150 times" for a driver B, and "100 times" for a driver C.

The screen switching button 86 is a button for switching the display content of the result display unit 85 to the number of times of traveling in the specific state per day within the predetermined time after the starting operation.

The screen switching button 87 is a button for switching the display content of the result display unit 85 to the number of times of traveling in the specific state per day within the predetermined time after the acceleration operation.

The screen switching button 88 is a button for switching the display content of the result display unit 85 to the number of times of traveling in the specific state per day within the predetermined time after the turn signal operation.

Figure 7:
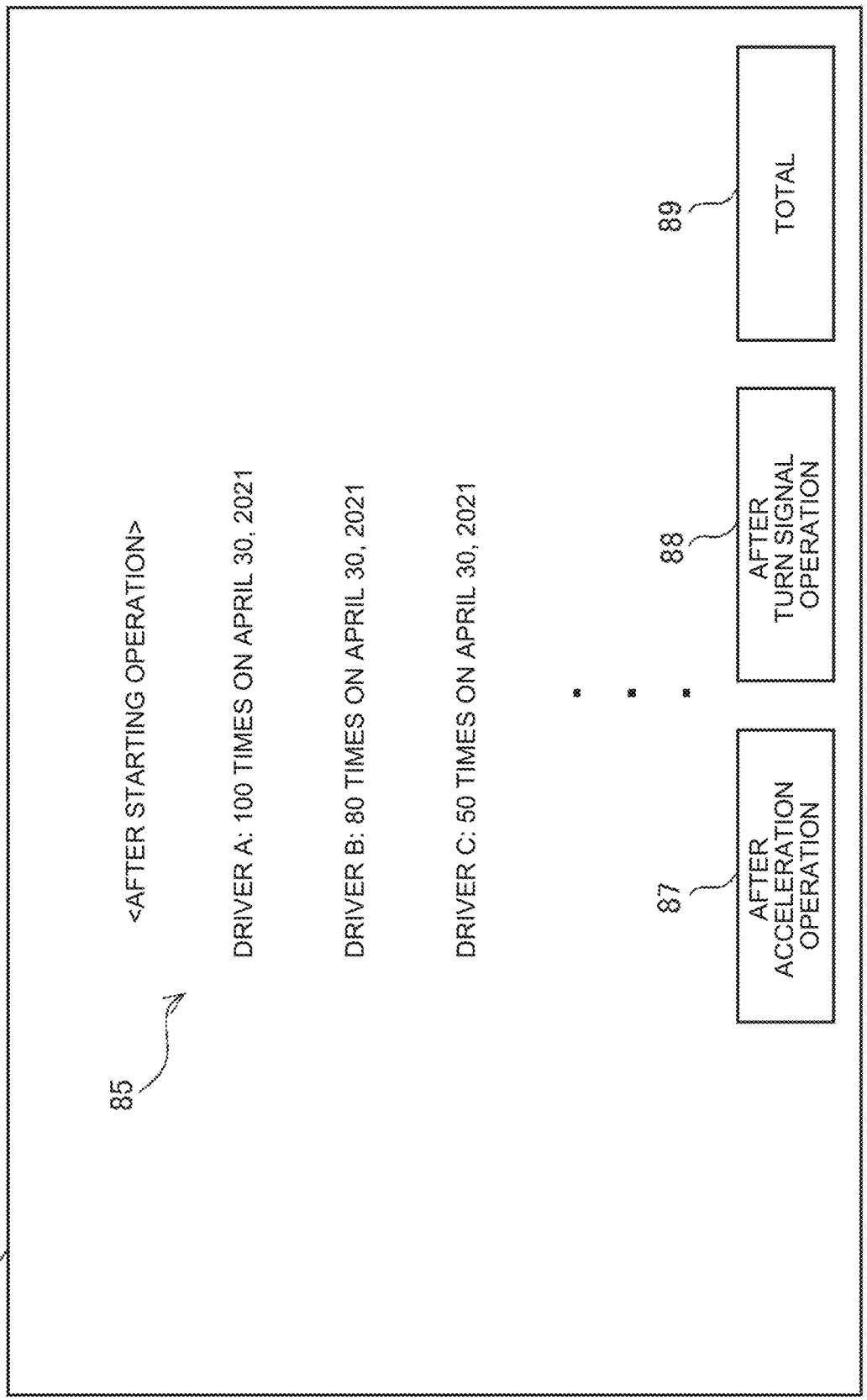
FIG. 7 is a second display example of the Web application displayed on the display control device according to the present embodiment.

FIG. 7 is a second display example of the Web application displayed on the display unit 26 of the display control device 20. The display example shown in FIG. 7 shows a state after the screen switching button 86 is operated while the display example shown in FIG. 6 is displayed.

In the display example shown in FIG. 7, the result display unit 85, the screen switching button 87, the screen switching button 88, and the screen switching button 89 are displayed.

The result display unit 85 shown in FIG. 7 displays the number of times of traveling in the specific state per day of the drivers managed by the manager within the predetermined time after the starting operation. Specifically, the result display unit 85 displays that the total number of traveling in the specific state on Apr. 30, 2021 within the predetermined time after the starting operation is "100 times" for the driver A, "80 times" for the driver B, and "50 times" for the driver C.

The screen switching button 89 is a button for switching the display content of the result display unit 85 to a screen displaying the total number of times of traveling in the specific state per day.

Figure 8:
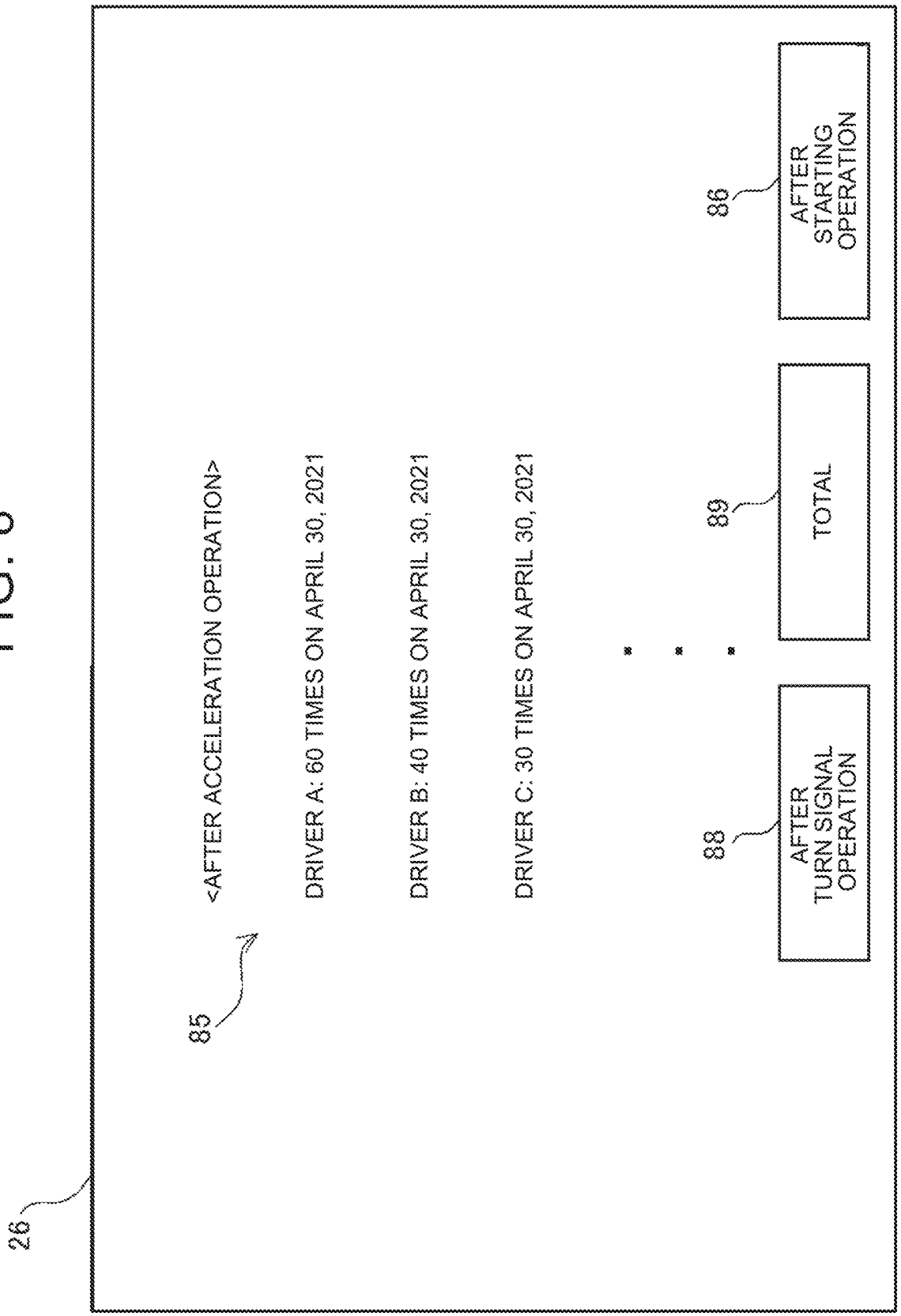
FIG. 8 is a third display example of the Web application displayed on the display control device according to the present embodiment.

FIG. 8 is a third display example of the Web application displayed on the display unit 26 of the display control device 20. The display example shown in FIG. 8 shows a state after the screen switching button 87 is operated while the display example shown in FIG. 7 is displayed.

In the display example shown in FIG. 8, the result display unit 85, the screen switching button 86, the screen switching button 88, and the screen switching button 89 are displayed.

The result display unit 85 shown in FIG. 8 displays the number of times of traveling in the specific state per day of the drivers managed by the manager within the predetermined time after the acceleration operation. Specifically, the result display unit 85 displays that the total number of traveling in the specific state on Apr. 30, 2021 within the predetermined time after the acceleration operation is "60 times" for the driver A, "40 times" for the driver B, and "30 times" for the driver C.

Figure 9:
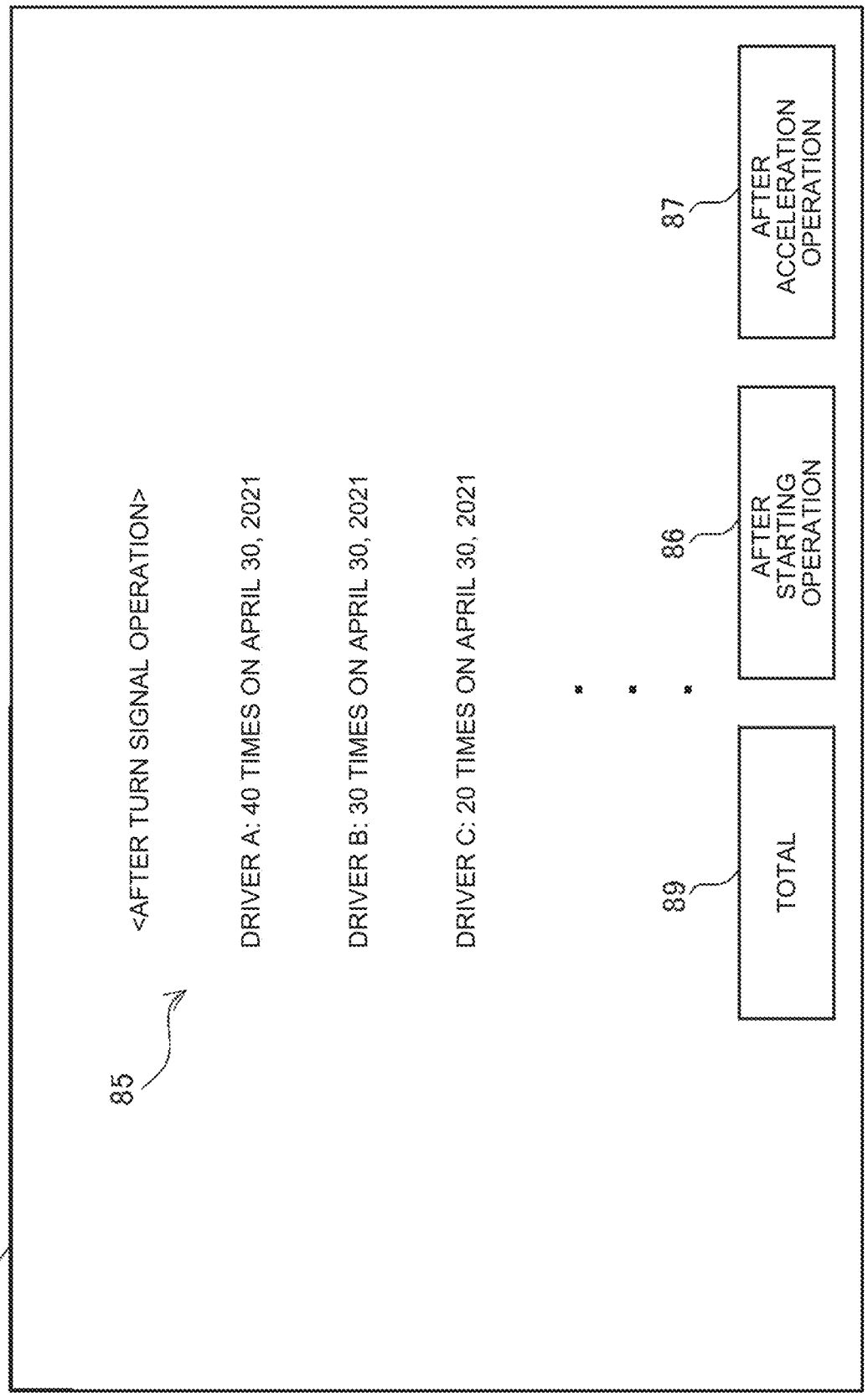
FIG. 9 is a fourth display example of the Web application displayed on the display control device according to the present embodiment.

FIG. 9 is a fourth display example of the Web application displayed on the display unit 26 of the display control device 20. The display example shown in FIG. 9 shows a state after the screen switching button 88 is operated while the display example shown in FIG. 8 is displayed.

In the display example shown in FIG. 9, the result display unit 85, the screen switching button 86, the screen switching button 87, and the screen switching button 89 are displayed.

The result display unit 85 shown in FIG. 9 displays the number of times of traveling in the specific state per day of the drivers managed by the manager within the predetermined time after the turn signal operation. Specifically, the result display unit 85 displays that the total number of traveling in the specific state on Apr. 30, 2021 within the predetermined time after the turn signal operation is "40 times" for the driver A, "30 times" for the driver B, and "20 times" for the driver C.

Here, among the drivers of businesses that operate vehicles, such as taxi companies and transportation companies, there are drivers who drive with good energy consumption efficiency and drivers who drive with poor energy consumption efficiency. In this case, the manager who manages the drivers usually desires that all the drivers perform energy-efficient driving.

As a result of verification by the applicant, it has been figured out that, in the hybrid electric vehicle, the driver who drives with poor fuel consumption efficiency of the engine has a large number of times of traveling in the specific state within the predetermined time after the predetermined driving operation, compared to the driver who drives with good fuel consumption efficiency of the engine.

As described above, in the present embodiment, the CPU 21 acquires the vehicle information of the vehicle 60. Further, the CPU 21 determines, based on the acquired vehicle information, whether the vehicle 60 has traveled in the specific state within the predetermined time from the predetermined driving operation of the vehicle 60. Then, the CPU 21 causes the display unit 26 to display the number of times of determined traveling in the specific state per day within the predetermined time from the predetermined driving operation. With this process, in the present embodiment, the number of times of traveling in the specific state per day is displayed on the display unit 26, whereby the driver can be caused to understand driving with poor energy consumption efficiency based on the number of traveling in the specific state when the driving guidance is provided. As an example, in the present embodiment, the manager confirms the number of times of traveling in the specific state for each driver displayed on the display unit 26, and instructs the driver who drives with poor energy consumption efficiency to reduce the number of times of traveling in the specific state, whereby the driver can understand that the driver is driving with poor energy consumption efficiency.

Further, in the present embodiment, the vehicle 60 is a hybrid electric vehicle equipped with a plurality of power sources of an engine and a motor. Then, the CPU 21 determines, based on the acquired vehicle information, whether the vehicle has traveled with poor fuel consumption efficiency of the engine as the specific state within the predetermined time from the predetermined driving operation of the vehicle 60. With this process, in the present embodiment, the number of times of traveling in the specific state per day is displayed on the display unit 26 in the hybrid electric vehicle, whereby the driver can be caused to understand driving with poor fuel consumption efficiency of the engine based on the number of traveling in the specific state when the driving guidance is provided. As an example, in the present embodiment, the manager confirms the number of times of traveling in the specific state for each driver displayed on the display unit 26, and instructs the driver who drives the hybrid electric vehicle with poor fuel consumption efficiency of the engine to reduce the number of times of traveling in the specific state, whereby the driver can understand that the driver is driving with poor fuel consumption efficiency of the engine.

Further, in the present embodiment, the above-mentioned predetermined driving operation is the starting operation, the acceleration operation, and the turn signal operation. With this configuration, in the present embodiment, the driver can be caused to understand the number of times of traveling, by the driver, with poor energy consumption efficiency within the predetermined time from the starting operation, the acceleration operation, and the turn signal operation. Then, in the present embodiment, the manager confirms the number of times of traveling in the specific state in each of the above-mentioned predetermined driving operations displayed on the display unit 26, whereby the driver who drives with poor energy consumption efficiency can be instructed for improving the starting operation, the acceleration operation, or the turn signal operation.

Others

In the above embodiment, in step S14 shown in FIG. 5, the CPU 21 causes the display unit 26 of the display control device 20 to display the number of times of traveling in the specific state per day corresponding to the driver of the vehicle 60. However, the present disclosure is not limited to this, and the CPU 21 may cause the display unit 46 of the driver terminal 40 to display the number.

FIG. 10 is a display example of the Web application displayed on the display unit 46 of the driver terminal 40. The CPU 21 causes the display unit 46 to display the display example shown in FIG. 10 when the Web application is executed in the driver terminal 40 and a predetermined operation is performed on the Web application. In the following, the driver terminal 40 is a smartphone owned by the driver A who is the driver of the vehicle 60.

In the display example shown in FIG. 10, the result display unit 85 is displayed. The result display unit 85 displays the number of times of traveling in the specific state per day for the driver A. Specifically, the result display unit 85 displays that the total number of traveling in the specific state on Apr. 30, 2021 is "200 times", the number of times of traveling in the specific state within the predetermined time after the starting operation is "100 times", the number of times of traveling in the specific state within the predetermined time after the acceleration operation is "60 times", and the number of times of traveling in the specific state within the predetermined time after the turn signal operation is "40 times".

Further, the number of times of traveling in the specific state per day corresponding to the driver of the vehicle 60 is not limited to be displayed on the display unit 26 of the display control device 20 and to be displayed on the display unit 46 of the driver terminal 40, and may be displayed on the monitor 78 of the vehicle 60.

According to the above embodiment, the vehicle 60 is a hybrid electric vehicle. However, the vehicle 60 is not limited to this, and may be a gasoline vehicle, a battery electric vehicle, or the like. When the vehicle 60 is a gasoline vehicle, the CPU 21 may determine, based on the acquired vehicle information, whether the vehicle 60 has traveled with poor fuel consumption efficiency of the engine as the specific state within the predetermined time from the predetermined driving operation of the vehicle 60. Further, when the vehicle 60 is a battery electric vehicle, the CPU 21 may determine, based on the acquired vehicle information, whether the vehicle 60 has traveled with poor electricity cost efficiency as the specific state within the predetermined time from the predetermined driving operation of the vehicle 60.

According to the above embodiment, the predetermined driving operation includes all of the starting operation, the acceleration operation, and the turn signal operation. However, the predetermined driving operation only needs to include at least one of the starting operation, the acceleration operation, and the turn signal operation.

It should be noted that various processors other than the CPU may execute the display process that is executed when the CPU 21 reads the software (program) in the above embodiment. Examples of the processors in this case include a programmable logic device (PLD) such as a field-programmable gate array (FPGA) for which a circuit configuration can be changed after production, a dedicated electric circuit that is a processor having a circuit configuration designed exclusively for executing a specific process, such as an application specific integrated circuit (ASIC), and the like. The display process may be executed by one of these various processors, or a combination of two or more processors of the same type or different types (for example, a combination of FPGAs, a combination of a CPU and an FPGA, and the like). Further, the hardware structure of these various processors is, more specifically, an electric circuit in which circuit elements such as semiconductor elements are combined.

Further, in the above embodiment, the mode in which the display control program 24A is stored (installed) in the storage unit 24 in advance has been described, but the present disclosure is not limited to this. The display control program 24A may be stored in a storage medium such as a compact disc read-only memory (CD-ROM), a digital versatile disc read-only memory (DVD-ROM), and a universal serial bus (USB) memory to be provided. Further, the display control program 24A may be downloaded from an external device via the network N.

What is claimed is:

1. A display control system configured to execute display control of a Web application comprising:
 a vehicle;
 a terminal device used by a driver of the vehicle; and
 a display control device configured to communicate with the vehicle and the terminal device via a network, wherein the display control device includes one or more processors configured to:
  acquire vehicle information related to a vehicle state of the vehicle;
  determine whether the vehicle has traveled in a state in which energy consumption efficiency of the vehicle is poor within a predetermined time from a predetermined driving operation of the vehicle based on the acquired vehicle information;
  store, based on a result of the determination, a number of times of traveling in the state per unit time within the predetermined time from the predetermined driving operation, the number of times being calculated and stored for each driver of the vehicle;
  cause a first display mounted on the display control device to display, via the Web application, the number of times for each driver of the vehicle, wherein the first display comprises a touch screen;
  receive a confirmation input via the touch screen for instructing the driver to reduce the number of times; and
  transmit instructions to the terminal device of the driver to cause a second display mounted on the terminal device to display, via the Web application, the number of times for the driver who uses the terminal device without displaying the number of times for another driver of the vehicle.

2. The display control system according to claim 1, wherein:
 the vehicle is a hybrid electric vehicle equipped with a plurality of power sources of an engine and a motor; and the one or more processors are configured to determine whether the vehicle has traveled with poor fuel consumption efficiency of the engine as the state within the predetermined time from the predetermined driving operation based on the acquired vehicle information.

3. The display control system according to claim 1, wherein the predetermined driving operation is at least one of an accelerator operation at a time of starting, an accelerator operation during traveling, or a turn signal operation.

4. A display control method comprising:
acquiring from a vehicle, using a network, vehicle information related to a vehicle state of the vehicle;
determining whether the vehicle has traveled in a state in which energy consumption efficiency of the vehicle is poor within a predetermined time from a predetermined driving operation of the vehicle based on the acquired vehicle information;
storing, based on a result of the determination, a number of times of traveling in the state per unit time within the predetermined time from the predetermined driving operation, wherein the number of times is calculated and stored for each driver of the vehicle;
causing a first display mounted on a display control device to display, via a Web application, the number of times for each driver of the vehicle, wherein the first display comprises a touch screen;
receiving a confirmation input via the touch screen;
instructing a driver of the vehicle to reduce the number of times in response to the confirmation; and
transmitting instructions to a terminal device of the driver to cause a second display mounted on the terminal device to display, via the Web application, the number of times for the driver who uses the terminal device without displaying the number of times for another driver of the vehicle.

5. A non-transitory computer readable medium storing instructions for causing a computer to:
acquire from a vehicle, using a network, vehicle information related to a vehicle state of the vehicle;
determine whether the vehicle has traveled in a state in which energy consumption efficiency of the vehicle is poor within a predetermined time from a predetermined driving operation of the vehicle based on the acquired vehicle information;
store, based on a result of the determination, a number of times of traveling in the state per unit time within the predetermined time from the predetermined driving operation, wherein the number of times is calculated and stored for each driver of the vehicle;
cause a first display mounted to a display control device to display, via a Web application, the number of times for each driver of the vehicle, wherein the first display comprises a touch screen;
receive a confirmation input via the touch screen;
instruct a driver of the vehicle to reduce the number of times in response to the confirmation; and
transmit instructions to a terminal device of the driver to cause a second display mounted on the terminal device to display, via the Web application, the number of times for the driver who uses the terminal device without displaying the number of times for another driver of the vehicle.

6. The display control system according to claim 1, wherein the one or more processors are configured to cause the first display to simultaneously display the number of times for each driver of the vehicle.

7. The display control system according to claim 1, wherein the one or more processors are configured to cause the first display to simultaneously display the number of times for each driver of the vehicle where the predetermined driving operation is an accelerator operation at the time of starting.

8. The display control system according to claim 1, wherein the one or more processors are configured to cause the first display to simultaneously display the number of times for each driver of the vehicle where the predetermined driving operation is an accelerator operation during traveling.

9. The display control system according to claim 1, wherein the one or more processors are configured to cause the first display to simultaneously display the number of times for each driver of the vehicle where the predetermined driving operation is a turn signal operation.

10. The display control system according to claim 1, wherein the one or more processors are configured to:
cause the first display to display including a plurality of switching buttons,
display a total the number of times for each driver of the vehicle in response to detection of selection of a first switching button of the plurality of switching buttons,
display the number of times for each driver where the predetermined driving operation is an accelerator operation at the time of starting in response to detection of selection of a second switching button of the plurality of switching buttons,
display the number of times for each driver where the predetermined driving operation is an accelerator operation during traveling in response to detection of selection of a third switching button of the plurality of switching buttons, and
display the number of times for each driver where the predetermined driving operation is a turn signal operation in response to detection of selection of a fourth switching button of the plurality of switching buttons.

11. The display control system according to claim 10, wherein the one or more processors are configured to:
cause the first display to hide a corresponding switching button of the plurality of switching buttons in response to detection of selection of the corresponding switching button.

12. The display control system according to claim 11, wherein the one or more processors are configured to:
cause the first display to display each of the plurality of switching buttons other than a switching button corresponding to information currently being displayed.

13. The display control system according to claim 10, wherein the terminal device is separable from the vehicle.

14. The display control system according to claim 1, wherein the vehicle comprises an acceleration sensor configured to capture the vehicle information based on acceleration of the vehicle, and the display control device is configured to determine whether the vehicle has traveled in the state in which energy consumption efficiency of the vehicle is poor based on the detected acceleration of the vehicle.

* * * * *